United States Patent Office 2,826,231
Patented Mar. 11, 1958

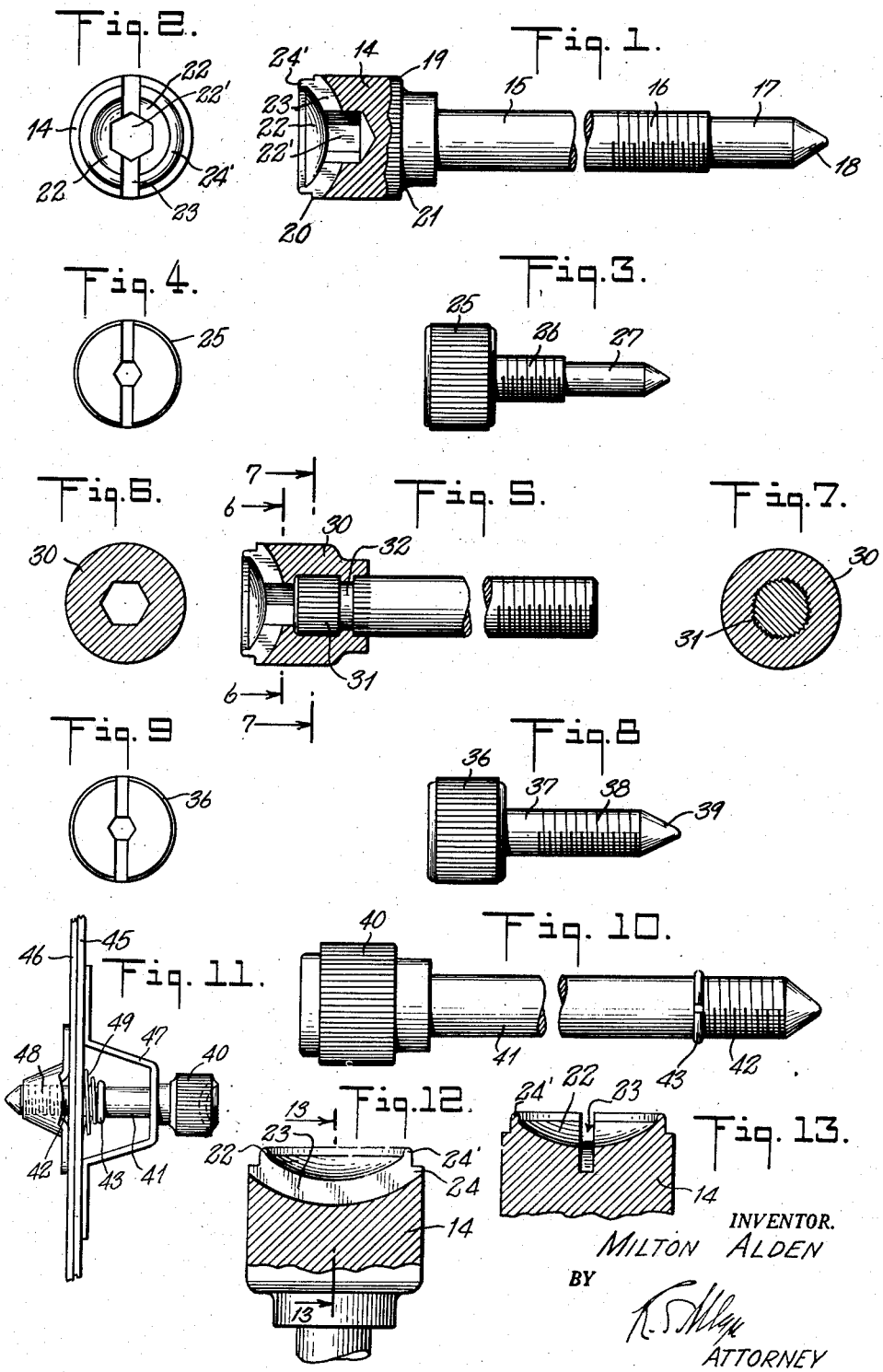

2,826,231

SCREW MOUNTING BRACKET FOR SHEET METAL AND SCREW HELD CAPTIVE THEREIN

Milton Alden, Needham, Mass.

Application September 3, 1953, Serial No. 378,240

2 Claims. (Cl. 151—41.7)

My invention relates particularly to a general purpose fastener and associated cap screw, such as are described in my copending application Serial No. 153,345, filed April 1, 1950, and now abandoned of which the present application is a continuation, that are capable of holding various parts together, such as the parts of radio cabinets; one of the objects being to provide a fastener which is particularly adapted to secure sheet metal parts.

Another object is to provide such a device with means enabling it to be actuated by a socket wrench or the fingers.

I have especially desired to provide a screw which can be readily actuated by a small coin, such as a penny or a dime. The same principle of construction, however, is applicable to larger screws, the heads of which are large enough to accommodate a larger coin as the driving tool.

The invention is particularly intended to facilitate actuation by a screw driver in difficult or inaccessible situations.

Another object is to provide a screw head that is adapted to be applied to different styles and sizes of screws.

Another object is to provide a form of screw that can be made commercially particularly when a longer shank is required.

I have discovered that such desirable objects can be combined in a screw having a head that is knurled, grooved or roughened about a cylindrical wall and provided with a concave outer face surrounded by a marginal rim and having an arcuate or concaved slot deep enough to provide adequate shoulders. A central socket is also desirable. These screws can be made in different sizes in which the heads, the slots and the sockets are properly proportioned to the shanks and the shanks threaded along any desired portions and blunt or pointed at the tips for various uses. In the larger sizes, the heads are preferably separately formed and secured to the shanks.

Fig. 1 is a side view of a screw embodying one form of my invention and showing the head integral with the shank and in section;

Fig. 2 is an end view of the same showing the recess in the head;

Fig. 3 is a side view of another embodiment of my invention;

Fig. 4 is an end view of the head of the screw of Fig. 3;

Fig. 5 is a side view of another screw of my invention having the head formed separately but attached to the shank and shown in section;

Fig. 6 is a transverse sectional view of the head, the section being taken on the plane of the line 6—6 of Fig. 5;

Fig. 7 is a transverse sectional view of the head, the section being taken on the plane of the line 7—7 of Fig. 5;

Fig. 8 is a side view of another screw of my invention;

Fig. 9 is an end view of the screw of Fig. 8;

Fig. 10 is a side view of a screw of my invention showing a retaining ring attached;

Fig. 11 is a side view and partial section showing two members secured together by a fastener using one of the screws;

Fig. 12 is an enlarged longitudinal section showing the head of a screw embodying one form of my invention; and Fig. 13 is a sectional view of the head shown in Fig. 12 on line 13—13.

Figs. 1 and 2 show one form of screw considerably enlarged having a head 14 and a shank having a smooth portion 15, a screw-threaded portion 16, a dowel portion 17 and a pointed tip 18.

The head is knurled or grooved longitudinally as at 19 so as to provide a maximum grip for the fingers and rounded at its ends at 20, 21. A diagonal knurling is less effective and unnecessary as the force applied to turn the screw is almost entirely rotational. The central part is concave at 22 and has a socket 22' preferably hexagonal to receive what is termed an "Allen" wrench. A transverse slot 23 intersects the central socket and according to the size of the head is made wide enough to take coins such as a dime, penny, quarter, or half dollar in the larger sizes. The slot is concave and deep enough to provide adequate shoulders 24 at the ends of the slot, the full diameter of the head, so as to afford a maximum engagement for the coin and also has a rim 24' to assist a screw driver in centering in the slot.

The enlarged head of Figs. 12 and 13 shows the concaved or dished outer face 22 of the head of the screw with a marginal centering rim 24' for directing the end of a screw driver. This also shows how the transverse slot 23 extends down into the head across the outer diameter of the head so as to provide shoulders 24 for engagement of the driving coins at the opposite edges of the head.

Such a screw can be readily made on an automatic screw machine.

Figs. 3 and 4 show a similarly formed head 25 with a shank threaded at 26 and ending in a dowel tip 27.

While the smaller screws may be provided with integral heads, it becomes uneconomical in the larger sizes. I accordingly form the head such as 30, Figs. 5 and 6, separately to be assembled on the shank. In this case, the shank has a knurled end 31 and a neck 32. The head is formed with a recess to receive parts 31 and 32 and is compressed about these parts to secure the head on the shank.

The longer screws can be made either in one piece or of two depending upon the material available and the use to which the screws are to be put. The two-piece screw has an advantage in that the same head may be kept in stock to be applied to various different shanks thus simplifying inventory. This second method is much more economical since it saves metal and time in production.

Figs. 8 and 9 show another form having a head 36, a smooth shank 37 terminating in a threaded part 38 and a pointed tip 39.

In Fig. 10 I have shown a screw with a head 40, shank portions 41, 42, and provided with a split ring 43 which can be attached to the shank. When the screw is inserted through a hole it can be prevented from falling out by placing such a retaining ring anywhere along the shank.

Naturally the size of the retaining ring must correspond with the size of the screw and must be of spring temper. The retaining ring can be spread with a standard tool for this purpose, positioned on the shank, and when the tool is removed the ring will spring closed, thus tightening around the shank and preventing the screw from falling out of the assembly.

A retaining ring of the above type can also be used in positioning such a retaining ring on the threads, although an ordinary round wire, spring tempered ring can be screwed on to the threads and will seat itself in the threads thus preventing the screw from dropping out of the assembly.

The diameter of the head for each size will be in proportion to the screw, thus making it possible to cold head all sizes. It is not possible to use the same size socket wrench as used on similar sizes of cap screws since this would make the hole in the top of the screw too large to allow sufficient stock for the slot which is also put in the head. I have therefore designed a screw to take a socket wrench which will permit sufficient leverage to tighten the screw and still keep the hole for the socket wrench small enough to allow sufficient stock for a well formed slot. The slot on the ¼–20 size is wide enough to accept a half dollar and all other coins of smaller monetary denomination. All other sizes are designed to accept a penny, dime or quarter. The top of the screw is made concave so that the end of a screw driver can find its way into a slot. This is particularly beneficial when the head is located deep inside of some apparatus and under ordinary conditions it would be difficult to find the slot with a screw driver. The knurling is straight since the friction of fingers on the head of the screw runs in only one direction. The fingers will only turn the screw and do not require friction for movement in the direction of the length.

For the ordinary task of inserting or removing a screw in a straight lengthwise movement the fingers can obtain sufficient friction from the straight knurling. This type of knurling also makes a better appearing job and eliminates the sharp points found in a cross-knurled piece. It is thus found that this screw can be tightened with the fingers, a screw driver, a coin which everyone has available whereas they may not have a screw driver available and a common socket wrench.

In standardizing such screws, there are three types of ends. The first type is a blunt end making it possible to use the screw in a dead-end hole. The second type is a cone point which makes it somewhat easier for the screw to locate itself in the hole into which it is being inserted; this type of point being used where a screw can be tightened up without the end striking the bottom of the hole. The third type is a dowel point which is the easiest type for locating the screw in the hole, and, although this type of point is available on all sizes except the 6–32, it will prove most beneficial on long shank screws where it may be necessary to locate the screw in a hole deep inside of a piece of equipment. The dowel point helps to find the hole much more readily. Also this type of point is quite helpful where the screw is fastened in a sub-assembly and when the sub-assembly is attached to the main assembly the screws can position themselves readily.

Fig. 11 shows a screw similar to that of Fig. 1 which screw has been further provided with a clamping ring 43 analogous to that described heretofore so that the screw can be used for connecting two plates 45 and 46. Plate 45 has an offset bracket 47 and plate 46 has a funnel-like guide nut 48 welded to it for engaging the tip of the dowel portion 18 to guide the screw shank 15 freely through the bracket 47 and through the plates 45 and 46 and bring the screw-threaded part 16 into engagement with the threaded portion 42 of the guide 48. The retaining ring 43 positions the screw between the bracket 47 and plate 45. The spring 49 biases the screw away from the plates so that when the screw threads 42 are free from the guide 48 the screw will be thrust outwardly from the guide and the plate 46.

This shows only one of the many uses for a screw of my invention.

It will be seen that this is a several purpose screw with purposes overlapping.

First, in general, this is a convenience screw so that manufactured articles can be assembled with power driven equipment, sufficiently tightening the screw against lock washers so that the fasteners will not loosen by vibration; yet each head has a self-centering slot of sufficient size and width so that a coin in the fingers will exert enough leverage to back the screw off of the washer—thus, wherever used, the screw can be loosened without tools.

In deep pockets, corners or other not readily accessible places a locating ring acts as a target to guide a screw driver or a socket wrench to the slot or socket— a dished top face guides the sliding of the socket wrench to the center or "centers" the driver until the point "finds" the slot; and the arc-shaped slot centering the driver just as it centers the coin when it is used.

The size of the head and its knurled side provide for sure finger grip so that, once loosened, the remaining turns are speeded up with the fingers.

In addition to all of these factors the screw is easily made captive so that spare parts or units always have the screws in place (with lock washers if desired).

The captive screw can also be used to pilot mechanical parts together without the need of locating dowels and for piloting electrical and other equipment in which connecting prongs or gears extend below the surfaces.

Weld nuts make these screws suitable for use with sheet metal—the nuts providing a "pilot" hole and an adequate number of threads for securely holding the screw in position. The same nuts may also be used in castings to save tapping time.

These nuts may be spot welded in place or secured by means of eyelets or screws—the raised ring around the center providing for quick positioning of the nut in assembly.

For experimenters, mold makers and the toolroom these convenience screws take the place of the conventional cap screw because of the added advantage of being easily used in inaccessible places yet always being able to quickly disassemble a product without tools as well as making the model at the start with fasteners suited for the manufacturing of a product in keeping with the modern trend of accessibility and interchangeability or unit replacement.

I claim:

1. A fastener for securing in abutting face to face relationship two sheet members having aligned apertures therethrough comprising a nut extending outwardly from the opposed non-abutting surface of one of the members, said nut having a flange welded to the member to maintain the nut aperture in coaxial alignment with the sheet metal apertures, a channel-shaped bridge member projecting outwardly from the opposed non-abutting surface of the other sheet metal member, said bridge member having a web portion with an aperture therethrough and ears for welding the bridge member to the other sheet metal member to maintain the web portion aperture in coaxial alignment with the sheet metal apertures, a cap screw having a head abutting the outer surface of the bridge member web portion and a threaded shank which extends through the aligned apertures to engage the threads of the nut, a snap ring surrounding the shank of the cap screw and disposed partially in an annular groove therein between the web portion of the bridge member and the outer surface of the associated sheet metal member, the outer diameter of said ring being larger than the diameter of said apertures, and a spring interposed between the snap ring and the associated sheet metal member.

2. A fastener for securing in abutting face to face relationship two sheet members having aligned apertures therethrough comprising a nut extending outwardly from the opposed non-abutting surface of one of the members, said nut having a flange welded to the member to maintain the nut aperture in coaxial alignment with the sheet metal apertures, a channel-shaped bridge member projecting outwardly from the opposed non-abutting surface of the other sheet metal member, said bridge member having a web portion with an aperture therethrough and ears for welding the bridge member to the other sheet metal member to maintain the web portion aperture in coaxial alignment with the sheet metal apertures, a cap screw having a head abutting the outer surface of the bridge member web portion and a threaded shank which extends through the aligned apertures to engage the threads of the nut, a snap ring surrounding the shank of the cap screw and disposed partially in an annular groove therein between the web portion of the bridge member and the outer surface of the associated sheet metal member, the outer diameter of said ring being larger than the diameter of said apertures, and a spring interposed between the snap ring and the associated sheet metal member, the length of the bolt shank between said groove and said head being at least equal to the axial length of said nut.

References Cited in the file of this patent

UNITED STATES PATENTS

| Number | Name | Date |
|---|---|---|
| 366,158 | Dow | July 5, 1887 |
| 1,346,058 | Robergel | July 6, 1920 |
| 1,609,772 | Rank | Dec. 7, 1926 |
| 1,911,820 | Fitzgerald | May 30, 1933 |
| 2,018,346 | Busby | Oct. 22, 1935 |
| 2,133,465 | Purtell | Oct. 18, 1938 |
| 2,140,628 | Hoff | Dec. 20, 1938 |
| 2,169,460 | Broughton | Aug. 15, 1939 |
| 2,421,172 | Ulrich et al. | May 27, 1947 |
| 2,429,833 | Luce | Oct. 28, 1947 |
| 2,556,155 | Stellin | June 5, 1951 |

FOREIGN PATENTS

| Number | Country | Date |
|---|---|---|
| 158,599 | Germany | Feb. 22, 1905 |
| 125,200 | Great Britain | Apr. 7, 1919 |
| 548,653 | Great Britain | Oct. 19, 1942 |
| 226,990 | Switzerland | May 15, 1943 |